Jan. 17, 1950     C. G. PARDEE     2,494,829
TOOL
Filed Dec. 4, 1947     2 Sheets-Sheet 1
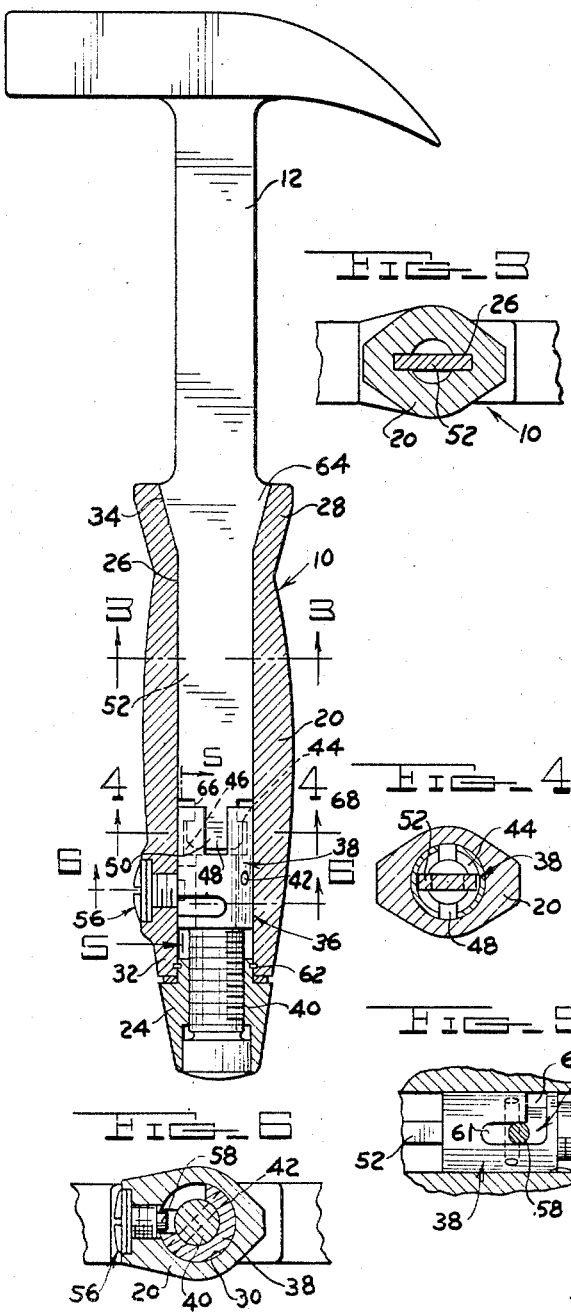
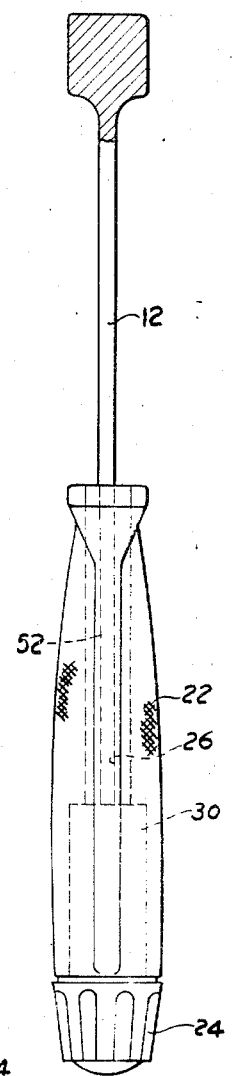
INVENTOR.
CURTIS G. PARDEE.
BY
*Joseph P. Teagno*
ATTORNEY.

Jan. 17, 1950
C. G. PARDEE
2,494,829
TOOL
Filed Dec. 4, 1947
2 Sheets-Sheet 2
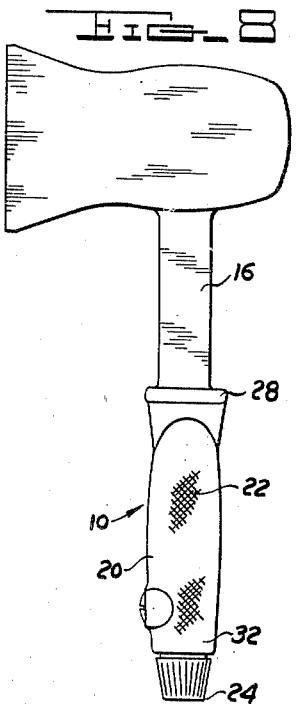
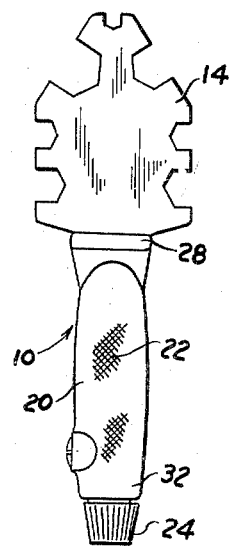
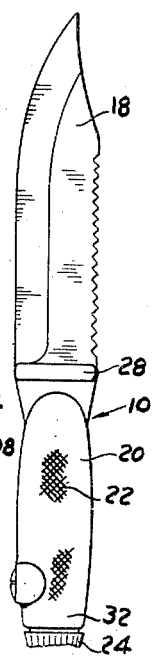
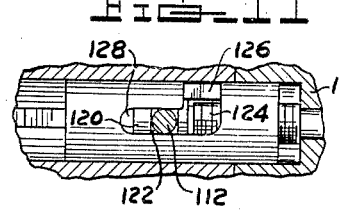
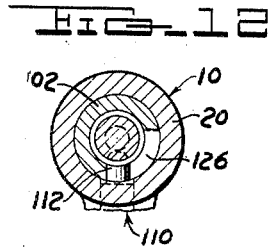
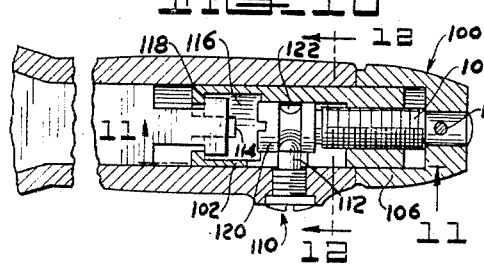
INVENTOR.
CURTIS G. PARDEE.
BY *Joseph F. Teagno*
ATTORNEY.

UNITED STATES PATENT OFFICE 2,494,829

TOOL

Curtis G. Pardee, Detroit, Mich.

Application December 4, 1947, Serial No. 789,582

6 Claims. (Cl. 279—39)

This invention relates to a sportsman's or woodman's kit and more particularly to a universal handle for the varied members going to make up a complete kit.

Broadly the invention comprehends the provision of a universal handle for use in conjunction with a plurality of members constituting a sportsman's kit or the like having holding or locking mechanism incorporated therein for effectively restraining the members from releasing themselves from the handle during an operational use thereof.

An object of the invention is the provision of a sportsman's kit holder that is reasonably simple and economical of construction and which is effective in use.

Another object of the invention is the provision of a tool or like kit handle member that has effective lock holding mechanism incorporated therein which permits a quick insertion or removal of the various tools therefrom.

Another object of the invention is the provision of a universal handle which is effective to lock various tool members therein merely by the insertion of a predetermined shaped shank of the tool into the handle and a slight rotation of one member of the handle to the main body thereof.

A further object of the invention is the provision of a handle adaptable to a set of specially constructed tools forming a part of a complete sportsman's kit or the like wherein each tool can be quickly inserted and positively held in the handle without fear of becoming free therefrom in an operational use thereof.

Other objects and advantages of the invention will appear from the following description taken in connection with the drawings forming a part of the specification; and in which:

Fig. 1 is a vertical cross-sectional view of a tool handle with a tool in locked relation therein;

Fig. 2 is a partially cross-sectionalized rear plan view of Fig. 1;

Fig. 3 is a horizontal cross-sectional view taken substantially along line 3—3 of Fig. 1;

Fig. 4 is a horizontal cross-sectional view taken substantially along line 4—4 of Fig. 1;

Fig. 5 is a vertical partially cross-sectionalized view taken substantially along line 5—5 of Fig. 1;

Fig. 6 is a horizontal cross-sectional view taken substantially along line 6—6 of Fig. 1;

Fig. 7 through Fig. 9 are side plan views of various tools in assembly in the handle of Fig. 1 and Fig. 2;

Fig. 10 is a vertical cross-sectional view of a handle having a modified form of locking mechanism from that of Fig. 1;

Fig. 11 is a vertical partially cross-sectionalized view taken substantially along line 11—11 of Fig. 10; and Fig. 12 is a horizontal cross-sectional view taken substantially along line 12—12 of Fig. 10.

This invention is directed at the provision of a handle having effective locking mechanism incorporated therein that is adaptable as a universal handle for the many tool members required by sportsmen in the course of pursuing their hobby.

Through the provision of a handle universally adapted to several tools constituting a sportsman's kit, a great saving in weight and space is attained which is an essential factor to anyone requiring said equipment. Although the weight and space factor is of such significant importance, it would pass for naught if a handle for accomplishing said savings did not incorporate an effective means for locking the various tools in the handle when in assembly therein.

The present handle while providing effective tool locking mechanism therein permits of ease in the insertion or removal of the various tools from the handle. The various tools have shanks terminating in a specific form adapted to cooperate with associated locking mechanism within the handle.

Referring to the drawings for more specific details of the invention, wherein like numerals refer to like parts, 10 represents generally a handle universally adapted to a plurality of tools such as a hammer 12, Fig. 1; a universal wrench 14, Fig. 7; an axe 16, Fig. 8; and a combination knife and fish scaler 18, Fig. 9, all forming a part of what is commonly referred to as a sportsman's kit.

The handle 10 which constitutes the basis of this invention comprises a main body portion 20 having an external hand gripping portion 22 and a lock manipulating member 24 supported thereon and relatively rotatable thereto.

The body 20 is provided with an axial rectangular slot 26, the purpose of which will hereinafter appear, extending from its tool receiving end 28 and communicating with a bore 30 which extends the remaining length of body 20 to open end 32 thereof. The narrow side walls of the slot 26 at the tool receiving end 28 are tapered as shown at 34, the purpose of which will hereinafter appear.

The handle 10 is provided with a tool locking mechanism 36 comprising a sleeve or lock barrel 38 arranged for relative rotation in bearing relation in the bore 30, a bolt member 40 fixedly secured by a pin 42 to the sleeve 38 internally thereof and member 24 within which the bolt is threadingly engaged.

The sleeve 38 is provided with an internal shoulder 44 affording an enlarged chamber 46 and is slotted at 48 adapted for the reception of a preformed end 50 on the shank 52 of hammer 12.

The sleeve 38 has a right angle cam slot 54 arranged in the peripheral surface thereof adapted to engage with a screw 56 threaded through the wall of handle and having a slot engaging portion 58 received within the slot.

Through the arrangement of the sleeve 38, bolt 40, member 24, screw 56, and body 20 as a cooperative operating mechanism, a rotation of the member 24 relative to body 20 causes an initial rotative movement of bolt 40 and sleeve 38 relative to body 20 and screw 56 wherein the portion 60 of slot 54, lying in a plane perpendicular to the axis of the sleeve engaging portion 58 of the screw resists axial movement of bolt 40 and sleeve 38.

As the member 24 is rotated further relative to the body 20 and the portion 58 of screw 56 comes into engagement with a portion 61 of slot 54 lying axial to the sleeve, the bolt 40 and sleeve 38 are moved axially through a relative threading rotation of the bolt 40 and member 24. A reverse rotation of member 24 relative to body 20 will cause a reversal of cooperating action between the associated members of locking mechanism 36.

The member 24 is held for rotation relative to body 20 by a snap ring 62 arranged in appropriate annular grooves of the member 24 and body.

The hammer 12 and all other tools to be utilized in connection with handle 10 are provided with shanks 52 having preformed ends 50 and ear portions 64. The cross-sectional dimensions of the shanks 52 between the preformed ends and ear portions thereof coincide with the size of the axial slot 26 in the body 20 of the handle so as to be received therein in close firm holding relation. The ear portions 64 have angular sides adapted to mate with the tapered wall portions of slot 26 and the preformed ends comprise a reduced portion 66 and a pair of ears 68 suitably adapted to be received by the slot 48 and the chamber 46 in the sleeve.

Prior to a normal insertion of hammer 12 in assembly in handle 10, the sleeve or lock barrel 38 should be moved to its forwardmost position in bore 30 wherein the member 24 has been rotated to its extreme counterclockwise position such that the slotted portion 48 of sleeve 38 is in direct alignment with the slot 26 across the length thereof. The shank 52 is then slipped into the slot 26 formed in the body 20 of the handle, it being noted that because of the structural relation of the shank of the hammer to the handle the shank can be received in either of two positions, that is 180° to itself.

As the shank is slipped into the body 20, the angular sides of the ear portions 64 abut the tapered walls 34 and the end portion 50 on the shank of the hammer 12 is received in the slot 48 of sleeve 38.

With the shank of the hammer 12 fitted in the handle, the member 24 is rotated relative to body 20 causing an initial concurrent rotation of bolt 40 and barrel 38 such that the ears 68 on the preformed end portion 50 of the shank are received in the chamber 46 in the sleeve 38 so as to hold the hammer in the handle. When the sleeve 38 has been rotated through an angle through which the portion 60 of slot 54 extends, a further rotation of member 24 relative to body 20 effects relative rotation therebetween with bolt 40 and causes an axial movement of the sleeve 38 as guided and limited by the portion 58 of screw 56 received in the axial portion of slot 54. As the sleeve is moved axially away from the shank of hammer 12, the shoulder 44 abuts the inner portions of ears 68 adjacent the reduced portion 66 of the preformed end 50 of the shank and draws the angular portions of ears 64 into frictional wedge holding engagement upon the taper of the handle tool receiving slot 26.

With the locking mechanism in its holding and locking position, as shown by Fig. 1, the hammer is securely held and will not work loose from the handle and thus remove any fear to a person using the assembled tool and handle of the possibility of injury occurring from the use of the mechanism.

Even though the tool assembled in the handle should become slightly loosened, the shoulder 44 of sleeve 38 will continue to hold the tool requiring a further rotation of the member 24 to again tighten and frictionally lock the tool in the handle.

Figs. 10 through 12 illustrate a modified form of locking mechanism 100 which can be employed in a universal handle similarly to locking mechanism 36.

The locking mechanism 100 comprises a sleeve or locking barrel 102, a bolt 104 threaded in the sleeve 102 for rotation relative thereto, a cylindrical member 106, arranged in abutting relation upon the end of the handle body fixedly secured to the bolt 104 by a pin 108 and a screw 110 threadingly secured in the handle body having a radially inward projecting portion 112 adapted to cooperate with the sleeve 102 and bolt 104.

The sleeve 102 is slotted at 114 on one end thereof for receipt of the preformed end of a tool, such as the hammer of Fig. 1 and a chamber 116 associated with the slot 114 terminating in a shoulder 118 adapted to bear against the ears on the shank of the associated tool when the slot 114 is rotated 90° to the plane of the shank when received in the slot and chamber of the sleeve.

The bolt 104 extends threadingly through the sleeve and is provided with a head 120 having an annular groove 122 which receives the portion 112 of the screw in engagement therewith so as to limit the bolt 104 to solely rotative motion relative to the body of the handle.

The sleeve 102 is provided with a right angle cam slot 124 arranged in the peripheral surface thereof receiving the end portion 112 of screw 110 which extends therethrough into engagement with the groove of bolt 104.

The locking mechanism 100 operates similarly to mechanism 36 in that with the member 106 rotated to its maximum counterclockwise position wherein the portion 112 of screw 110 is at the end of the slot 124 in that portion 126 of the slot lying in a plane perpendicular to the axis of the sleeve 102.

As the member 106 is initially rotated clockwise the bolt 104 and sleeve 102 are rotated as a unit through the portion 126 of slot 124 whereupon as the end 112 of screw 110 restricts further rotation of the sleeve as the member 106 is further rotated, the member 106 and bolt 104 are rotated relative to the sleeve causing the sleeve to move axially along the axially extended portion 128 of slot 124. This mechanism operates to hold and lock the shank portion of a preformed end of a tool similar to hammer 12 in a like and effective manner as mechanism 36.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A handle for supporting tool members adapted to be associated therewith comprising a hand-holding portion having an opening therethrough, and a tool-holding and locking mechanism in the opening of the hand-holding portion at one end thereof comprisig a member manually rotatable relative to the hand-holding portion, a cylindrical member threadingly supported on the member rotatable with and axially movable thereto having an opening in one end adapted for receipt of a predetermined shaped portion on a shank of a tool to be held by the handle and a cam slot in its circumferential surface, and means affixed the hand-holding portion cooperating with the cam slot in the cylindrical member for controlling the movement of the cylindrical member relative to the manually rotatable member and hand-holding portion.

2. A tool kit handle comprising a body member having an opening extending axially therethrough, and a locking mechanism arranged in the opening comprising a member rotatable relative to the body, a member threadingly supported thereon relatively rotatable with and axially movable thereto having a tool shank receiving opening in one end comprising a slot conforming to the opening in the body and a connecting annular groove in which the tool shank is adapted to be fixedly held and cam cooperative means between the body and member supported on the member relatively rotatable to the body for controlling the rotation and axial movement of said supported member relative to its supporting member.

3. A sportsman's kit tool-holding handle comprising a hand-holding portion having a substantially rectangular opening extending centrally therethrough and a tool-locking mechanism in the hand-holding portion comprising a member manually rotatable relative to the hand-holding portion on one end thereof concentric thereto, a cylindrical member in the opening in the hand-holding portion coupled to the manually rotatable member for rotation with and axially relative thereto having a preformed opening in one end comprising a rectangular slot conforming to the opening in the hand holding portion and a connected circular opening adapted to receive the predetermined shaped end of the shank of a tool to be held by the handle, and cam operative means incorporated between the hand-holding portion and cylindrical member for guiding the movement of the cylindrical member axially and rotatively relative to the hand-holding portion, said opening in the hand-holding portion extending from the end thereof oppositely disposed from the locking mechanism substantially to the opening in the cylindrical member being of a cross-section conforming substantially to the cross-section of the shank of the tool to be held thereby.

4. A sportsman's kit tool-holding handle comprising a hand-holding portion having an opening extending centrally therethrough and a tool-locking mechanism in the hand-holding portion comprising a member manually rotatable relative to the hand-holding portion on one end thereof concentric thereto, a cylindrical member in the opening in the hand-holding portion coupled to the manually rotatable member for rotation with and axially relative thereto having a preformed opening in one end comprising a slot conforming to the opening in the hand holding portion and a connecting annular groove adapted to receive the predetermined shaped end of the shank of a tool to be held by the handle, and cam means incorporated between the hand-holding portion and cylindrical member for guiding the movement of the cylindrical member axially and rotatively relative to the hand-holding portion, said opening in the hand-holding portion extending from the end thereof oppositely disposed from the locking mechanism substantially to the opening in the cylindrical member being of a cross-section conforming substantially to the cross-section of the shank of the tool to be held thereby and terminating oppositely disposed from the locking mechanism end thereof in outward flaring tapered walls adapted to receive preformed portions on the shank of the tool in wedge contacting relation, said slot in the cylindrical member adapted to be disposed at substantially right angles to the opening in the hand-holding portion during a locking operation of the handle.

5. A handle for holding a variety of tools having identical predetermined shaped shank ends comprising a hand-holding member having an opening extending axially therethrough, and a tool-locking mechanism in one end of the opening therein comprising a member manually rotatable relative to the hand-holding member, a member threaded in the manually rotatable member, a cylindrical member bearing upon a wall of the opening in the hand-holding member secured to the member threaded in the manually rotatable member for movement therewith having an opening in one end for receiving the predetermined shaped shank end of a tool to be held and locked in the hand-holding member and a cam surface in the external peripheral wall thereof and means on the hand-holding member extending into engagement with the cam surface for controlling the axial and rotative motion of the cylindrical member relative to the hand-holding portion upon rotation of the manually rotatable member relative to the hand-holding member.

6. A handle for holding a variety of tools having identical predetermined shaped shank ends comprising a hand-holding member and a mechanism in one end of the opening therein for clamping and locking the tools to be inserted in the handle comprising a member mounted concentrically juxtaposed one open end of the hand-holding member manually relatively rotatable thereto, an externally threaded member secured on the manually rotatable member extending axially into the opening in the hand-holding member, a cylindrical member threaded upon the externally threaded member movable in the opening in the hand-holding portion having an opening in one end thereof for receiving the predetermined shaped shank ends of tools to be associated therewith and a cam surface in the peripheral wall thereof, and means on the hand-holding member engageable with the cam surface for controlling the rotative and axial movement of the cylindrical member relative to the hand-holding member and engageable with the external threaded member for holding the locking mechanism as a unit in the hand-holding member.

CURTIS G. PARDEE.

REFERENCES CITED

The following references are of record in the file of this patent:

UNITED STATES PATENTS

| Number | Name | Date |
|--------|------|------|
| 709,603 | Larsen | Sept. 23, 1902 |
| 862,838 | Murray | Aug. 6, 1907 |
| 886,809 | Howell | May 5, 1908 |